United States Patent
Conesa Torres et al.

(10) Patent No.: US 12,460,867 B2
(45) Date of Patent: Nov. 4, 2025

(54) SYSTEM FOR CONTROLLING TEMPERATURE OF A BODY

(71) Applicant: INSTITUTO NACIONAL DE TÉCNICA AEROESPACIAL "ESTEBAN TERRADAS", Torrejón de Ardoz (ES)

(72) Inventors: Antonio Jesús Conesa Torres, Torrejón de Ardoz (ES); Ángel Cabrera Revuelta, Torrejón de Ardoz (ES); Mario Sánchez García, Torrejón de Ardoz (ES)

(73) Assignee: INSTITUTO NACIONAL DE TÉCNICA AEROESPACIAL "ESTEBAN TERRADAS", Torrejón de Ardoz (ES)

( * ) Notice: Subject to any disclaimer, the term of this patent is extended or adjusted under 35 U.S.C. 154(b) by 210 days.

(21) Appl. No.: 18/546,603

(22) PCT Filed: Feb. 16, 2022

(86) PCT No.: PCT/EP2022/053787
§ 371 (c)(1),
(2) Date: Aug. 16, 2023

(87) PCT Pub. No.: WO2022/179907
PCT Pub. Date: Sep. 1, 2022

(65) Prior Publication Data
US 2024/0133632 A1    Apr. 25, 2024
US 2024/0230235 A9    Jul. 11, 2024

(30) Foreign Application Priority Data
Feb. 23, 2021   (EP) ..................... 21382145

(51) Int. Cl.
*G05D 23/19*    (2006.01)
*F28C 3/00*     (2006.01)
(Continued)

(52) U.S. Cl.
CPC ......... *F28C 3/005* (2013.01); *G05D 23/1919* (2013.01); *H01T 23/00* (2013.01); *H05H 1/2406* (2013.01)

(58) Field of Classification Search
CPC ..... F28C 3/005; G05D 23/1919; H01T 23/00; H05H 1/2406; H05H 1/2439;
(Continued)

(56) References Cited

U.S. PATENT DOCUMENTS 7,380,756 B1 * 6/2008 Enloe ................... H05H 1/2439
244/175
8,227,051 B1 * 7/2012 Paulauskas ............ D06M 11/34
427/113

(Continued)

FOREIGN PATENT DOCUMENTS

EP    2365219 A2    9/2011
WO   2012178147 A2  12/2012

OTHER PUBLICATIONS

International Search Report and Written Opinion in related International application No. PCT/EP2022/053787, dated Jun. 7, 2022.

*Primary Examiner* — Nelson J Nieves
(74) *Attorney, Agent, or Firm* — Nathan & Associates Patent Agents Ltd.; Menachem Nathan

(57) ABSTRACT

A system for controlling temperature of a body (6) comprising a DBD actuator (9) connectable to a power source to produce an ionic wind on the body; a control unit (8) to select an initial configuration and to control the power source (5) depending on a temperature difference (ΔT) between an input temperature ($T_i$) and a target temperature (Continued)

($T_{ta}$) on the body (6), wherein the initial configuration comprises the following constructive parameters of the DBD actuator: number, shape, geometry, relative position of electrodes (d), dielectric material, dielectric thickness (e), wherein the initial configuration further comprises the following setting parameters to be set in the power source (5): a frequency value (f), an amplitude value (V), a waveform signal and a duty cycle, wherein the control unit (8) adjusts the initial configuration by modifying any of the setting parameters to control the heat transferred to the surface of the body.

14 Claims, 7 Drawing Sheets

(51) Int. Cl.
   *H01T 23/00* (2006.01)
   *H05H 1/24* (2006.01)
(58) Field of Classification Search
   CPC .............. H05H 1/2418; B64C 2230/12; B64C 23/005; B64C 23/04; F05D 2270/172; F05D 2250/323; F05D 2250/324; F05D 2260/962; A61B 2018/00589; A61B 2018/00601; A61B 2018/00607; A61B 2018/00994; A61B 2018/1213; A61B 2018/126; A61B 2018/162; H01J 37/32348; H01J 37/3244; H01J 37/32541
   See application file for complete search history.

(56) References Cited

U.S. PATENT DOCUMENTS

| | | | |
|---|---|---|---|
| 9,951,800 B2* | 4/2018 | Segawa | B60L 5/20 |
| 11,492,101 B2* | 11/2022 | Kato | F15D 1/0075 |
| 2011/0048025 A1* | 3/2011 | Ginn | F02K 1/386 |
| | | | 60/770 |
| 2019/0193863 A1* | 6/2019 | Abdollahzadehsangroudi | |
| | | | B64D 15/20 |
| 2022/0046781 A1* | 2/2022 | Watanabe | H01J 37/32541 |
| 2022/0053628 A1* | 2/2022 | Itoh | A61B 18/16 |
| 2024/0316494 A1* | 9/2024 | Michan | H01J 37/32348 |
| 2024/0342679 A1* | 10/2024 | Kaneko | C01B 13/10 |

\* cited by examiner

SYSTEM FOR CONTROLLING TEMPERATURE OF A BODY

FIELD

The present disclosure generally teaches techniques related to heat exchange. More particularly, it concerns temperature control techniques using ionic winds formed with plasma actuators based on Dielectric Barrier Discharge (DBD) effect.

BACKGROUND

There are many applications in several fields where thermal management needs to be improved either for increasing or decreasing temperature of a body. For example, in the field of electronics, miniaturization of integrated circuits requires proper refrigeration to compensate for heat increase. Yet, existing proposals are commonly bulky, noisy and/or complex (e.g. adding mechanical parts or gyroscopic effects). In the field of aeronautics another example illustrates the opposite situation, low temperatures during in-flight causes icing, an adverse phenomenon which affects aerodynamics and aircraft performance.

Among other techniques, Dielectric Barrier Discharge (DBD) effect can be used in heating. DBD is known since the XIX century, a high alternating voltage produces a non-thermal discharge between two electrodes separated by an insulating dielectric barrier. When these electrodes are arranged in an asymmetrical configuration, an ionic wind is obtained.

Actuators capable of producing the DBD effect are called DBD actuators. These are devices usually having two or more electrodes overlapped (an exposed electrode and an insulated electrode) and separated by a dielectric medium. The electrodes can be of any conductive material. When a high voltage and high frequency AC power is supplied, a plasma discharge is created. Momentum is transferred from the plasma discharge to surrounding through a collision of ions with neutral molecules which produce induced air and body force.

Known DBD actuators have been used in the industry in applications related to flow control. However, DBD actuators for transferring heat are rare and limited to heating applications.

There are other techniques of plasma generation, like Corona discharge. Corona discharge is also a non-thermal discharge generated by the application of high direct voltage to sharp electrode tips.

Therefore, there is a current need in the state of the art to enable DBD actuators to better control temperature of a body, so that improved cooling, improved heating or alternate cooling and heating may be provided.

SUMMARY

The present invention was made in view of the limitations of the state of the art and the demanding need for proper thermal management. A system capable of surface cooling and/or heating capabilities is proposed according to the independent claim. The system may be used in anti-freeze (also referred as anti-icing) applications and defrost (also referred as deicing) applications among others. The system is capable of generating an ionic wind, as a result of air ionization, the temperature and several characteristics of which can be varied depending on certain operating conditions. The ionic wind may be used to modify, e.g. remove, the boundary layer and achieve an improvement in convective heat transfer. Advantageously, both cooling and heating of a surface can be achieved either in one embodiment of the system with an alternative function or, in separate embodiments, one particularly adapted for cooling, other particularly adapted for heating.

The system comprises a DBD actuator to be located near a body, e.g. to be thermally regulated, in such a way that an ionic wind is produced. The DBD actuator includes electrodes and a non-gaseous dielectric material. When a gradient of electric field is produced between the electrodes, a force is generated in the decreasing direction of the electric field and is applied to the weakly ionized air on the surface of the dielectric material. In their displacement, the ions collide with neutral air molecules transferring them momentum and producing an air flow from these impacts, such air flow is called ionic wind. The speed and volume of this ionic wind increases with voltage and with frequency among other parameters. The ionic wind can modify the properties of the boundary layer and the structure of the flow.

The present invention provides a system for controlling temperature of a body comprising a DBD actuator configured to be connectable to a power source and to produce an ionic wind on the body, and a control unit configured to select an initial configuration and to control the power source depending on a temperature difference between an input temperature ($T_i$) and a target temperature ($T_{ta}$) on the body. The initial configuration comprises the following constructive parameters of the DBD actuator: number of electrodes, shape and geometry of electrodes, relative position between electrodes (d), dielectric material, dielectric thickness (e), and the following setting parameters to be set in the power source: a frequency value (f), an amplitude value (V), a waveform signal and a duty cycle. The control unit is further configured to adjust the initial configuration by modifying any of the setting parameters to control the heat transferred to the produced ionic wind.

Several embodiments of the system may be defined according to the dependent claims. Among others, for instance, different DBD actuators may be used having diverse features according to number of electrodes, shape of electrodes (i.e. flat, wavy, round or cylinder shaped), position (i.e. edges distance, parallel, coplanar, etc.), geometry (toothed, straight, spiky, etc.), encapsulation (lacking, uniform, variable), structure of its components (rigid, flexible), etc. Such are constructive features that relate to the manufacturing design of the DBD actuator.

Similarly, the characteristics of voltage signal applied to the electrodes of the DBD actuator of the system changes the overall behavior. By doing so, the ionic wind can be modified. These characteristics are for instance frequency, amplitude, waveform or duty cycle. They are considered setting parameters that can be easily changed if required. To that end, it is proposed a control unit configured to change the setting of the power source according to the intended application. The setting parameters of the DBD actuator may be considered when controlling the power source.

For instance, to generate a certain degree of cooling or heating on the body, the control unit may set a particular waveform, voltage and/or frequency for the power source and to monitor if the result is achieved or otherwise the setting needs adjustments. The selection of parameters has an influence by increasing or decreasing the temperature, speed and/or volume of the ionic wind produced by the DBD actuator. It also affects the boundary layer.

The performance of the system is limited by the input temperature to the DBD ($T_i$) and is affected by the target temperature ($T_{ta}$). Even if these could be fixed, both could also be modified. Actually, $T_{ta}$ is a value set by design and could be modified by the user, while $T_i$ could, for example, be modified by forcing the flow from different areas in the surroundings of the DBD system with higher or lower temperatures or through heating/cooling systems located at the DBD inlet, furthermore it could be estimated and introduced manually. Notice that $T_{ta}$ could be selected in a way that it is unreachable, forcing the system to only work in one sense (only heating or only cooling).

In some uses the system could take advantage of the presence of a sensor measuring in real time any parameter of interest in the system (for example, a sensor identifying the presence of ice). This parameter can be used to further adapt the control of the system. In a preferred embodiment, this sensor is a temperature sensor measuring the temperature of the body.

Importantly to achieve cooling or heating, the present invention copes with a complex tradeoff and balance of features. There are features producing opposite effects, either constructive or setting parameters. There also are certain features which may change its behavior in the opposite direction when are modified.

For instance, a greater separation between electrodes implies a larger discharge zone but a smaller region with plasma and a weaker ion wind formation. On the other hand, when separating the electrodes, the discharge is non-homogeneous, thereby the behavior is less repeatable. To compensate for the non-homogeneity of the discharge, the shape of the edge of the electrode (usually straight) can be modified. For instance, it is proposed that the edge may be in the form of a sawtooth or spiky. So, selecting a proper edge geometry causes the discharges to start on a certain region of the electrode. Consequently, the discharge is more homogeneous, and thus the intensity of the electric field is increased. In this case, the edge geometry compensates for the effect of separation of the two electrodes.

Similarly, the control unit may dynamically change the setting of the power source via certain setting parameters to act on the DBD behavior in a quick way.

The control unit influences how the ionic wind is produced to achieve the intended application. For instance, the following parameters are key to feed the DBD actuator: waveform, duty cycle, amplitude and frequency of the voltage signal. As a result, thermal regulation of a body can be achieved. The generation of the ionic wind that impinges on the surface of the body can vary and different thermal regulation (either cooling or heating or alternatively both) can be obtained.

The robustness of the system may be enhanced, for instance, a dielectric breakdown due to excessive heating in the DBD actuator can be prevented. The control unit may decrease excitation frequency while maintaining voltage amplitude to diminishing temperature if the temperature sensor indicates a value greater than a safety threshold (e.g. temperature limit).

The system saves energy consumption in the power source. For instance, it is capable of working for cooling a body with a lower frequency (e.g. 1 kHz or less).

The system has a number of additional advantages such as: low weight, reduced volume occupation (no need for a heatsink or fan in cooling applications), flexibility to adapt to a specific shape, low maintenance and a combination of functionalities (cooling and heating).

The teachings of the present invention would also allow reducing complexity and improving integration of thermal protection systems which may be applicable to heterogeneous technologies.

DETAILED DESCRIPTION

Several aspects and embodiments of the invention will be explained with reference to the drawings for a better understanding.

Figure 1:
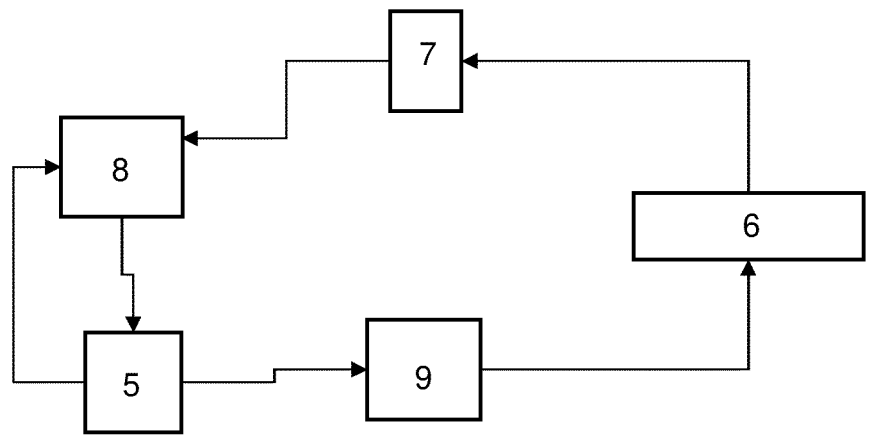
FIG. 1 shows a schematic block diagram with elements of an embodiment of the system.

FIG. 1 shows a simplified block diagram according to one embodiment of the invention. A temperature sensor (7) measures the temperature of a body (6) and provides this value to a control unit (8). The power source (5) supplies alternate voltage to a DBD actuator (9). The control unit (8) controls a power source (5) depending on the temperature of the body (6) and also depending on a target temperature. The control unit (8) may select a certain setting of the power source (5) as an initial configuration. Cooling or heating may be applied depending on the current temperature of the body (6) given by the temperature sensor (7) and the target temperature. In the initial configuration the constructive features of DBD actuator may also be considered. The electrodes of the DBD actuator create a plasma region that causes an ionic wind towards the body (6). The control unit (8) may thus produce cooling or heating of the body (6) by varying setting parameters such as voltage frequency and/or voltage amplitude and/or the waveform and/or the duty cycle to check after an interval of time, $\Delta t$, with the temperature sensor (7) whether the temperature of the body has changed as desired. If the temperature of the body has not sufficiently changed upon checking, the initial configuration may be adjusted to facilitate reaching the target temperature.

The control unit can be activated to operate in heating or cooling mode based on the temperature sensor and on the target temperature. Moreover, control unit may include other input signals to modify how it works. Additionally, the control unit may allow operating in manual mode for selecting either of the two settings (cooling or heating).

In the heating mode, the default waveform will be nano pulses (ns-DBD). If, with the preset configuration, the target temperature cannot be reached, the excitation voltage is increased and then the frequency. For example, it can be done alternatively or even simultaneously. When the target temperature is reached, it can be changed to a waveform with lower consumption, by introducing a non-stationary wave with a duty cycle or in the form of bursts.

In the cooling mode, the preset waveform will preferably be a sinusoidal AC signal. If the target temperature is not reached with the preset conditions, the excitation voltage will be increased. Note that during the increase of the excitation voltage to achieve the cooling of the surface, an undesired effect may occur: an increase in temperature may appear. In such a circumstance, the excitation frequency is reduced or excited with a non-stationary wave through a duty cycle. The control unit may use a similar actuation to reduce power consumption once the target temperature is reached.

Notice that the system presented in FIG. 1, is also valid without temperature sensor (7). In this case control could be prefixed or managed manually.

Figure 2:
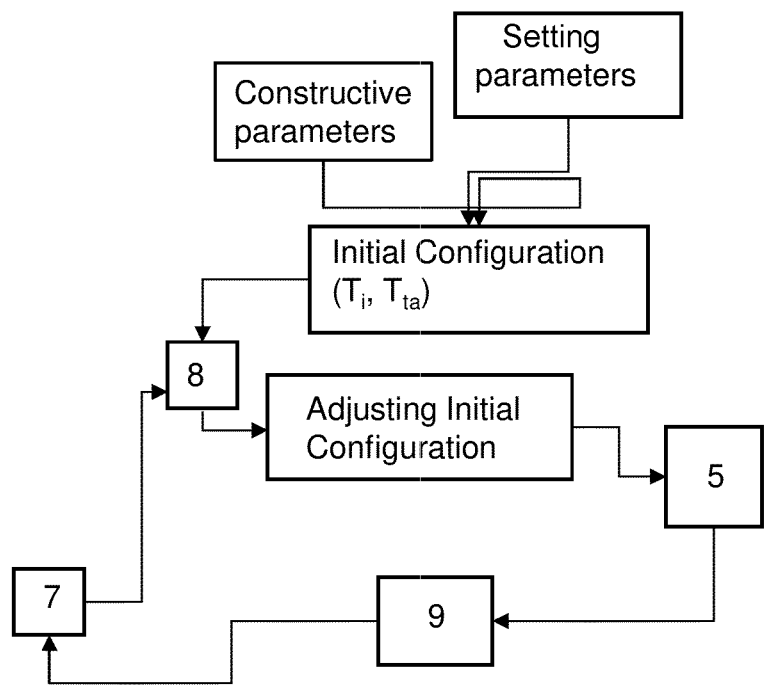
FIG. 2 shows a schematic block diagram of a control unit of an embodiment of the system.

FIG. 2 shows another block diagram of the control unit 8. The control unit (8) may consider an initial configuration with setting parameters of the power source (5) and constructive parameters of the DBD actuator (9) to properly adjust the initial configuration, e.g. the setting parameters of the power source (5). The constructive parameters of the DBD actuator (9) can be part of the inputs for the control unit (8) (e.g. safety operation values such as limit amplitude of voltage for a certain frequency range, limit frequency of voltage signal for a certain amplitude range, limit temperature of DBD actuator).

The control unit (8) is configured to monitor a safety operation for the DBD actuator (9) by checking whether a modification in a setting parameter of the power source (5) causes reaching a limit operation value for the DBD actuator (9), being the limit operation value selected according to the remainder setting parameters in the power source (5).

Figure 3:
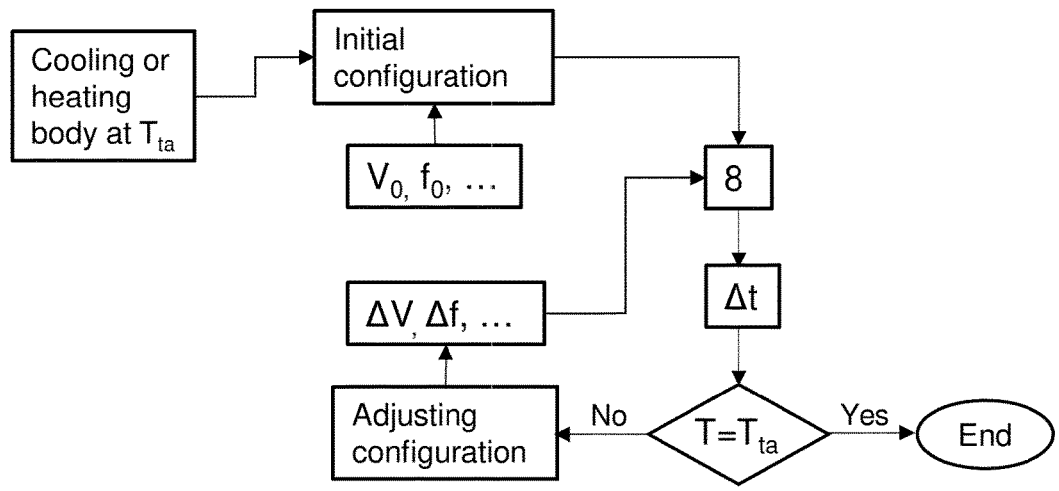
FIG. 3 shows an exemplary flow diagram of a control unit for cooling or heating a body of an embodiment of the system.

FIG. 3 shows a flow diagram of an implementation of the control unit (8) for temperature control. If temperature of a body ($T_b$) is below (heating) or above (cooling) $T_{ta}$ degrees, an initial configuration is used to operate the power source and create plasma with the DBD actuator. After a certain amount of time, $\Delta t$, the body temperature is compared with the desired target value $T_{ta}$. If there is a temperature difference between $T_b$ and $T_{ta}$, the control unit may adjust the initial configuration by modifying setting parameters of the power unit. The setting parameters can be thus selectively modified for cooling or heating.

Figure 4:
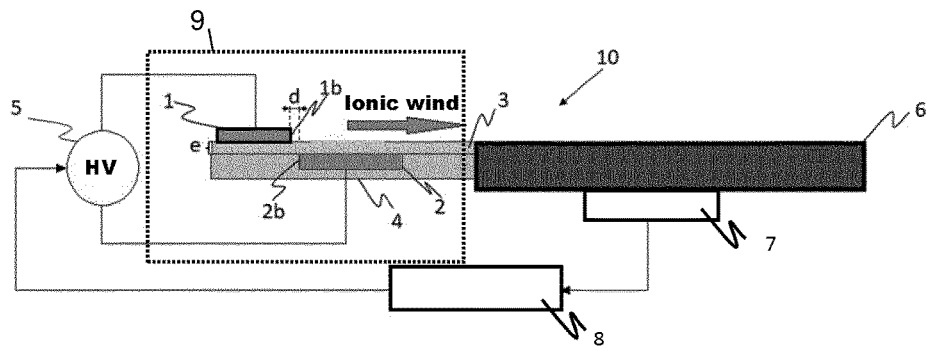
FIG. 4 shows a schematic representation of an embodiment of a system with a DBD actuator.

FIG. 4 shows a schematic representation of an embodiment of a system 10 for modifying the temperature of a body 6 based on dielectric barrier discharge (DBD) effect. The system 10 includes a DBD actuator with two electrodes. A first electrode 1 has a side exposed to the exterior (generally, surrounding air but also other fluids), a second electrode 2 has an encapsulation structure 4 in order to avoid unwanted effects and reduction of power consumption. Both electrodes are connected to a power supply 5 that provides a high alternate voltage. Other DBD actuators may be suitable as discussed later. Preferably, voltage waveform and associated parameters may be defined according to the intended use. Some of the parameters to be set as frequency, amplitude, waveform, duty cycle, will be explained later. As can be seen the electrodes 1, 2 are located in parallel planes, defining a space for a dielectric layer 3 between them of certain thickness "e". The electrodes 1, 2 are not vertically aligned, there is an offset "d" between the edges 1b, 2b, when a high voltage is applied, causes an ionization of the air and an ionic wind is generated as indicated by the arrow which may be employed for several purposes. In particular, cooling or heating the surface of the body 6. Notice, that d>0 means a gap or separation between the electrodes, i.e. a gap from edge 2b to edge 1b while d<0 implies at least partial overlapping between both electrodes, i.e. edge 2b is under electrode 1. As a general rule, a configuration with d<0 should be preferred for heating applications, while d>0 configurations would be preferred for cooling.

Figures 5A, 5B, 5C:
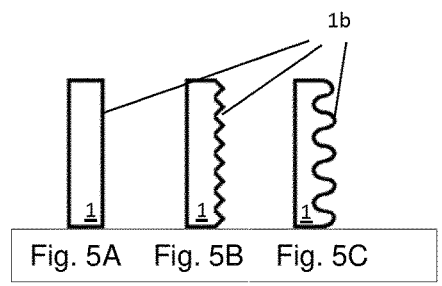
FIGS. 5A-5C show three different shapes of the exposed electrodes for a DBD actuator.

FIGS. 5A-5C shows three different shapes of the exposed electrodes. Geometric characteristics may vary. FIG. 5A shows an electrode having straight edges. FIG. 5B shows an electrode having triangular teeth. FIG. 5C shows an electrode having sinusoidal edges. The edge shape is of importance for producing a suitable discharge as explained later.

It has been found that the thickness of the electrodes is not a key factor. However, the less the thickness, the better. Generally, thickness of electrodes should be below 200 microns, preferably about 50 microns.

Figures 6A, 6B:
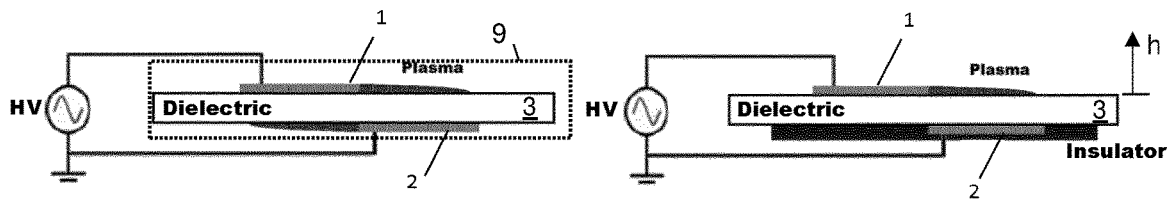
FIG. 6A shows a DBD actuator having a lower electrode without encapsulation.
FIG. 6B shows a DBD actuator having a lower encapsulated electrode.

FIG. 6A illustrates a simplified DBD actuator defined by two electrodes 1, 2 located on opposite sides of a dielectric medium 3 arranged in an asymmetric configuration. In this embodiment there is no encapsulated electrode. An alternating high voltage source 5 applies a voltage to the electrodes 1, 2. In the context of the present document, high voltage should be understood from 5 kVpp to 50 kVpp. Above a voltage threshold an electrical discharge occurs, the air is ionized on both sides of the dielectric material, in the regions with the greatest intensity of the electric field. Plasma is formed on both sides of the dielectric material 3. Consequently, an ionic wind is produced on both sides with opposite direction.

FIG. 6B illustrates another simplified DBD actuator. In this case, the plasma generation is produced on only one side of the dielectric 3. To prevent the generation of plasma on the other side of the dielectric, one of the electrodes is isolated, for example, by making it an encapsulated electrode. A region of plasma forms on the exposed electrode. In general, the electrode connected to ground is usually the encapsulated electrode.

The plasma region is formed due to the intense electric field obtained by applying a high voltage signal to the electrodes. The ionized air contained in the plasma region propagates from edge 1b of exposed electrode 1 to encapsulated electrode 2, generating an ionic wind.

The dielectric material prevents an electric arc from forming between the two electrodes. Furthermore, the accumulation of charge in the dielectric material 3 causes the discharge to decrease and ultimately to extinguish. For this reason, an alternating voltage signal is normally used.

Figure 7:
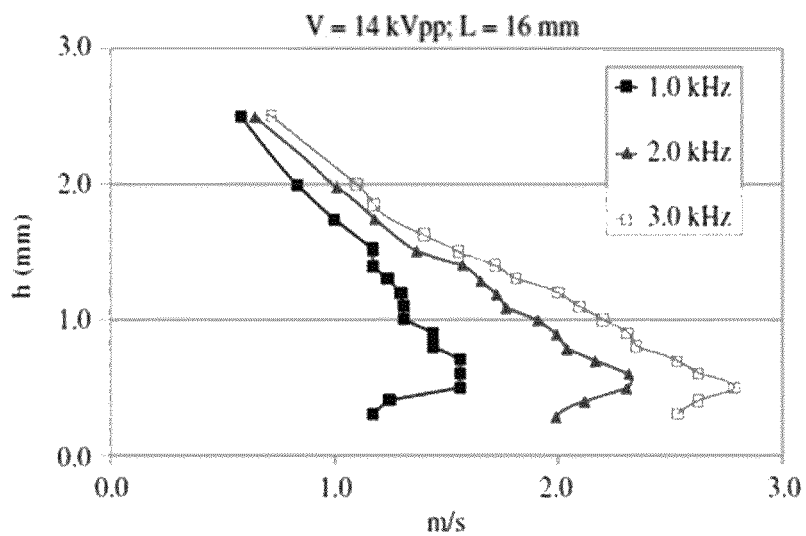
FIG. 7 shows, for three voltage frequencies, experimental results of speed of ionic wind variation with height over the DBD actuator of FIG. 6B.

FIG. 7 illustrates experimental measurements of induced ionic wind speed as a function of h, the height above the DBD actuator surface as depicted in FIG. 6B. Kapton® is used as the dielectric element and three different frequency values (1 kHz, 2 kHz, 3 kHz) for a supply voltage of 14 kVpp (amplitude of 7 kV) and at L=16 mm from trailing-edge exposed electrode (1*b*). It is found that the higher the frequency, the higher the speed of the ionic wind. This fact is employed by the control unit to modify the functioning of the DBD actuator. Speed reaches maximum near the actuator surface, between a height of 0.5 and 1 mm.

In FIGS. 8A-8G different formation of the electrical wind can be seen schematically according to various system embodiments of DBD (9) in which the constructive parameters of the DBD actuator (arrangement, size, number, etc.) of the electrodes vary. The point of the arrow indicates the direction of the ionic wind. The size of the arrow is not related to the speed magnitude.

Figure 8A:
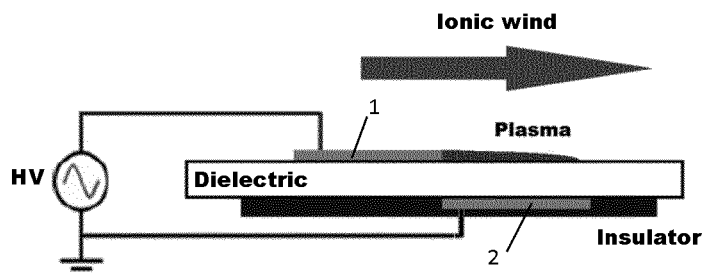
FIGS. 8A-8G show different constructive embodiments of DBD actuators for the system.

FIG. 8A illustrates the case where exposed electrode 1 is placed on top of a dielectric layer 3. Encapsulated electrode 2 is placed on the opposite side of the dielectric layer. Both electrodes 1,2 are laminar (e.g. of foil tape) and are arranged on parallel planes and having a displacement on respective edges. Plasma is generated at the edge of the exposed electrode 1 closer to the encapsulated electrode 2. A DBD actuator like this may be suitable for cooling and heating application.

Figure 8B:
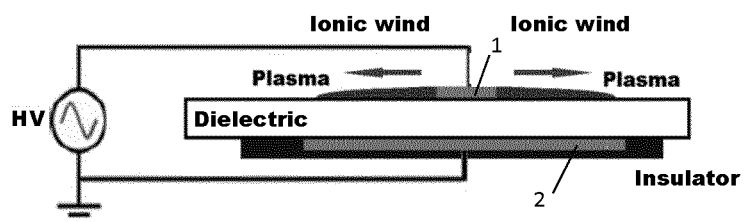

FIG. 8B illustrates the case where exposed electrode 1 is placed on top of a dielectric layer 3. Encapsulated electrode 2 is placed on the opposite side of the dielectric. Both electrodes 1,2 are laminar and are arranged on parallel planes. The exposed electrode 1 is smaller than the encapsulated electrode 2, and completely superimposed. Plasma is generated at both edges of the exposed electrode 1. A DBD actuator like this may be more suitable for heating applications.

Figure 8C:
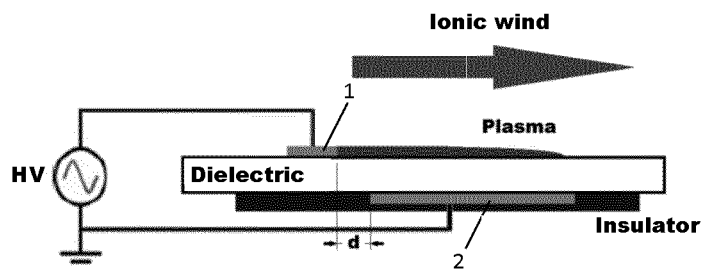

FIG. 8C shows another embodiment where the projection of one electrode on the other defines an additional separation or gap. This gap between exposed electrode 1 and encapsulated electrode 2 can be modified to suit the needs. A DBD actuator like this may be more suitable for cooling applications.

Figure 8D:
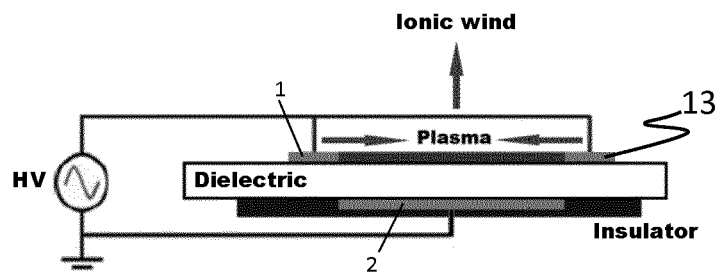

FIG. 8D depicts another embodiment with an additional third electrode. In this configuration, an electric wind is generated perpendicular to the surface of the body 6. Concerning to the three electrodes, two electrodes are exposed and connected to the same power source. An electric wind is generated so that the wind direction can be modified 180 degrees; to achieve this result the voltage and/or frequency applied to electrodes 1 and 13 should be different, two power supplies could be used. A DBD actuator like this may be more suitable for heating applications.

Figure 8E:
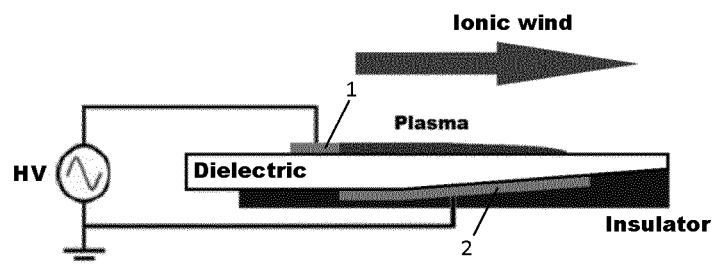

FIG. 8E shows another embodiment similar to the configuration explained in FIG. 8A where the thickness of the dielectric is not constant. A part of the encapsulated electrode is not parallel to the plane of the exposed electrode. A larger plasma region is produced by decreasing the thickness of the dielectric in a region where intensity of the electric field decreases. A DBD actuator like this may be more suitable for cooling applications.

Figure 8F:
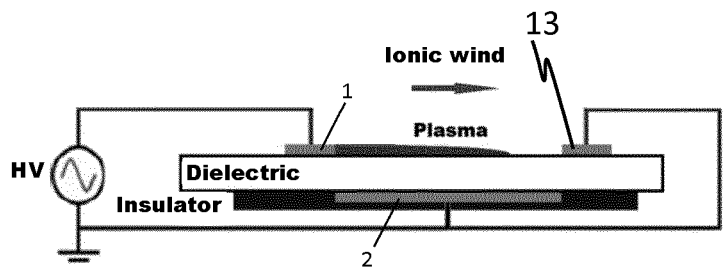

FIG. 8F depicts another embodiment with three electrodes. In this configuration, the third electrode 13 is electrically connected to the ground encapsulated electrode. When electrode 1 is connected to an alternating high voltage signal and electrodes 2 and 13 are connected to ground, the discharge has the advantage that electrode 13 allows greater charge neutralization, reducing charge accumulation in the dielectric material 3. A DBD actuator like this may be more suitable for heating applications.

Figure 8G:
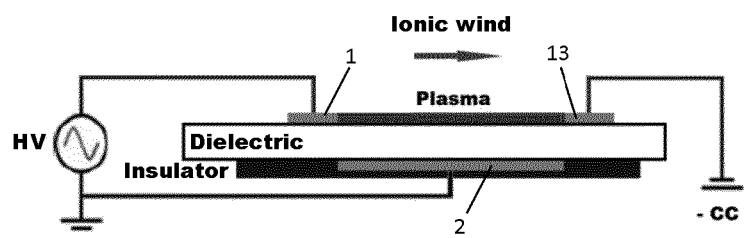

FIG. 8G shows an embodiment according to a configuration called "sliding discharge" with three electrodes and combines a corona and DBD discharge. There are two exposed electrodes and one encapsulated electrode, separated by the dielectric element 3. In this arrangement the additional electrode 13 is connected to a negative direct current source. Between electrodes 1 and 2 there is a basic DBD. There are corona discharge channels formed from electrode 1 to electrode 13. This configuration achieves a larger plasma region with a reduced voltage. A DBD actuator like this may be more suitable for heating applications.

Above configurations are merely illustrative. Other types can be defined. Combinations of different configuration are also possible, even some of them sharing electrodes.

Although the figures show a single DBD actuator (9), a system may comprise multiple actuators acting on the same body or on different ones. Notice that the shape of electrodes is neither limited to be flat or laminar nor to be parallel between them. Actually, benefits of the performance of the system can be foreseen when the DBD, and its components, adapt to the body or to a specific shape.

Additional constructive parameters that also influence the performance of the embodiments are discussed below.

Thickness of the exposed electrode has a relative influence on the intensity of the electric field. The width and the material from which electrodes are made are not very important. The thinner the exposed electrode is, the better results in terms of generation of ionic wind.

The width of the encapsulated electrode produces an increase in the length of the plasma region, which improves the performance. However, above a certain value no further improvement is obtained.

The arrangement of opposite electrodes can be so that an offset "d" exists between edges to be placed in front one another; consequently, the parameter "d" can be negative or positive. The best results for ionic wind generation are obtained with an offset of −1 mm to 1 mm. The overlapping electrodes configuration is related to a more uniform discharge. This embodiment also allows a slight increase in performance.

The material of the dielectric layer is of great importance, affecting the performance of the DBD system and its maximum operating conditions. Typical materials used as dielectrics include Teflon®, crystal, Kapton®, Macor®, bakelite, quartz, Delrin®, methacrylate and polycarbonate, among others. In practice, there is no perfect dielectric medium and the most appropriate one depends on the specific application.

Apart from previous considerations, the electrical excitation is also of great importance in the behavior of the system.

Figure 9:
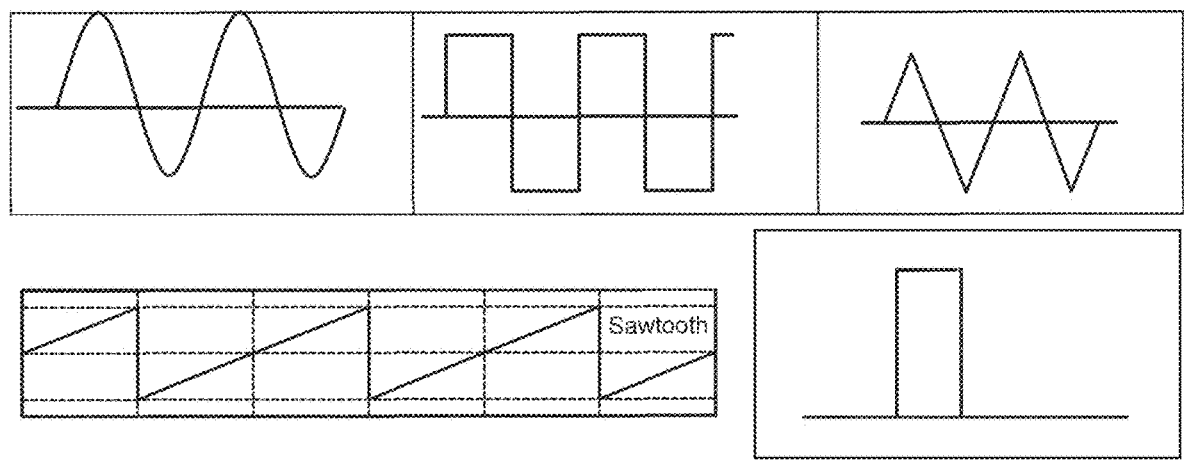
FIG. 9 shows different wave forms.

FIG. 9 shows several types of electrical signals that can be used to feed the system: sine, rectangular, triangular, sawtooth, and pulse. In a general way, sinusoidal waveforms are preferred for cooling applications, whereas very short duration pulses are preferred for heating ones.

Non-stationary excitation can be obtained by modulating a voltage signal using pulses. For example, turning on and off an alternating current signal at a certain frequency. The relationship between the action time and the excitation period gives us the duty cycle. A stationary performance has a 100% duty cycle. A non-stationary actuation can excite instabilities in a detached boundary layer, obtaining better results than in stationary actuation.

Figure 10:
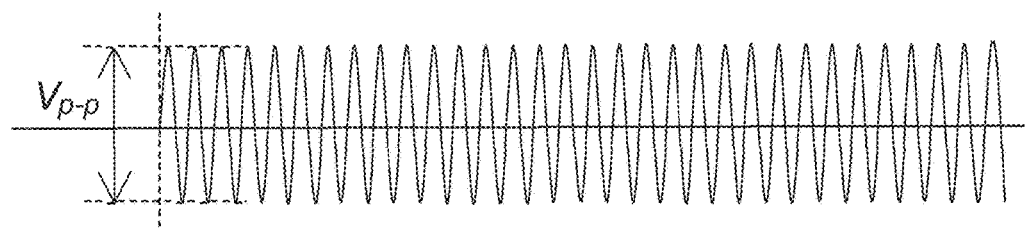
FIG. 10 shows a stationary and a non-stationary waveform.

FIG. 10 shows a stationary and a non-stationary waveform. This type of excitation is valid in both cooling and heating. Regarding frequency, nanosecond pulse discharges can be more efficient than microsecond discharges. The power source needs to be capable of providing such a short duration signal.

Nanosecond pulse discharge, also referred as ns-DBD, have shown to be effective for flow control applications over a wide range of Mach. A great effect on heat transfer is also shown, thereby causing quick heating. A configuration based on nanoseconds pulse discharge is basically the same as a normal DBD, also referred as AC-DBD in this context, previously discussed. All the settings discussed are valid and applicable for both.

In a ns-DBDs configuration the Joule effect is key. The heating of the air around the system is so quick that produces compression waves propagating at sonic speeds. In ns-DBD systems, excitation is produced by high voltage pulses (5-50 kV) with rise time in the order of tens of nanoseconds and with a duration between 5 ns to 200 ns, as seen in FIG. 11.

Figure 11:
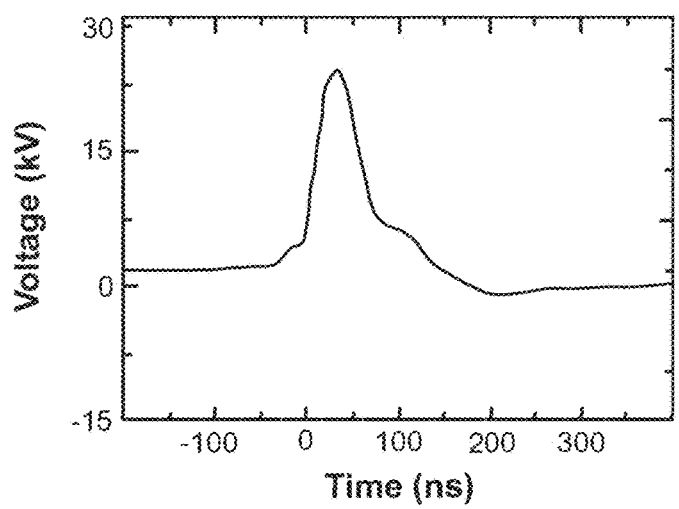
FIG. 11 shows a single pulse waveform generated in the power source.

FIG. 11 shows a typical form for a single pulse that is repeated according to a certain frequency. These pulses are used in the so-called ns-DBD configuration. The application of the ns-DBD configuration is an anti-icing element due to a great capacity to generate heat in order to avoid ice formation in airplanes.

Figure 12B:
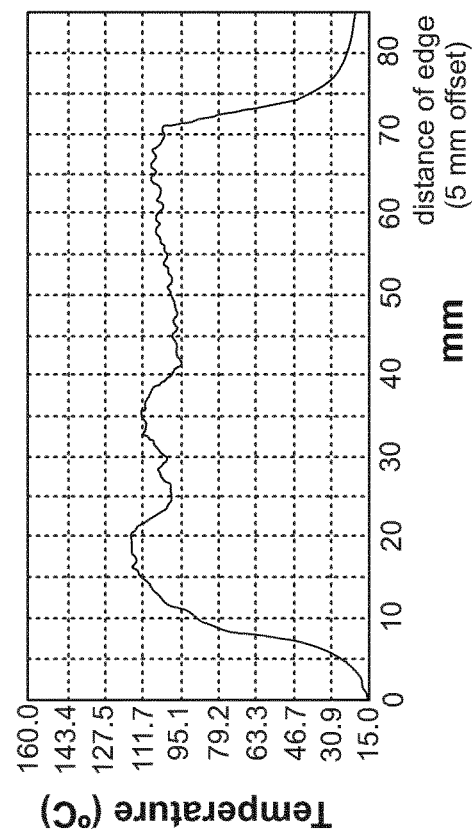
FIG. 12B shows temperature versus distance curve regarding the heating of the embodiment of a system of FIG. 8A.
Figure 12A:
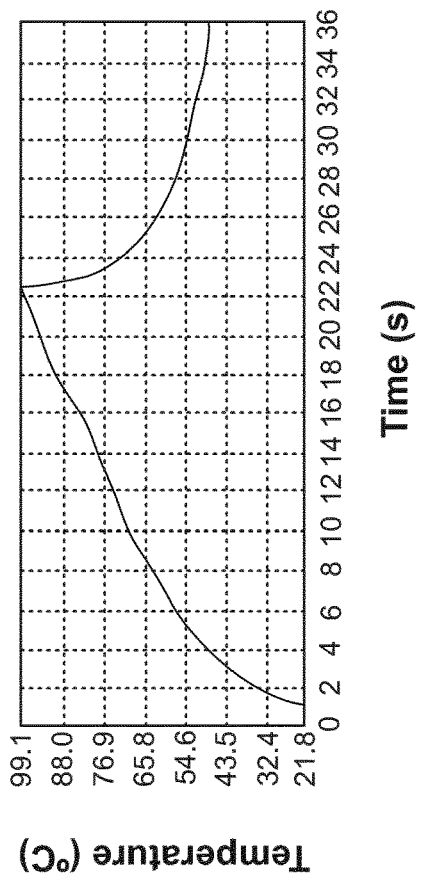
FIG. 12A shows temperature versus time curve regarding the heating of the embodiment of a system of FIG. 8A.

FIGS. 12A-12B present experimental results for heating. FIG. 12A shows the temperature variation over time of an embodiment of a system in the configuration of FIG. 8A. Likewise, FIG. 12B shows the temperature variation on a line parallel to the edge "1 b" and located 5 mm from the mentioned edge. An increase of almost 100° C. can be achieved in about 20 seconds. The particular settings used are a frequency of 1500 Hz, an amplitude of 16 kV, the waveform is a nanosecond pulse. Higher frequencies may achieve even better results.

An increase in voltage and frequency implies increasing the heating capacity in an anti-freeze or defrost system. Yet alternatively or additionally, an increase in the region heated can be achieved by a "sliding discharge" configuration of FIG. 8G.

As to the cooling capacity, care should be taken to obtain the desired result, if voltage or frequency are increased with the aim of generating more ionic wind, an increase in the temperature of the wind itself is also obtained. The increase in temperature may neutralize the expected improvement. It may even cause the opposite effect as can be seen in the following figures. This effect is taken into account by the control unit to properly control the power source not to revert the intended aim.

Figure 13A:
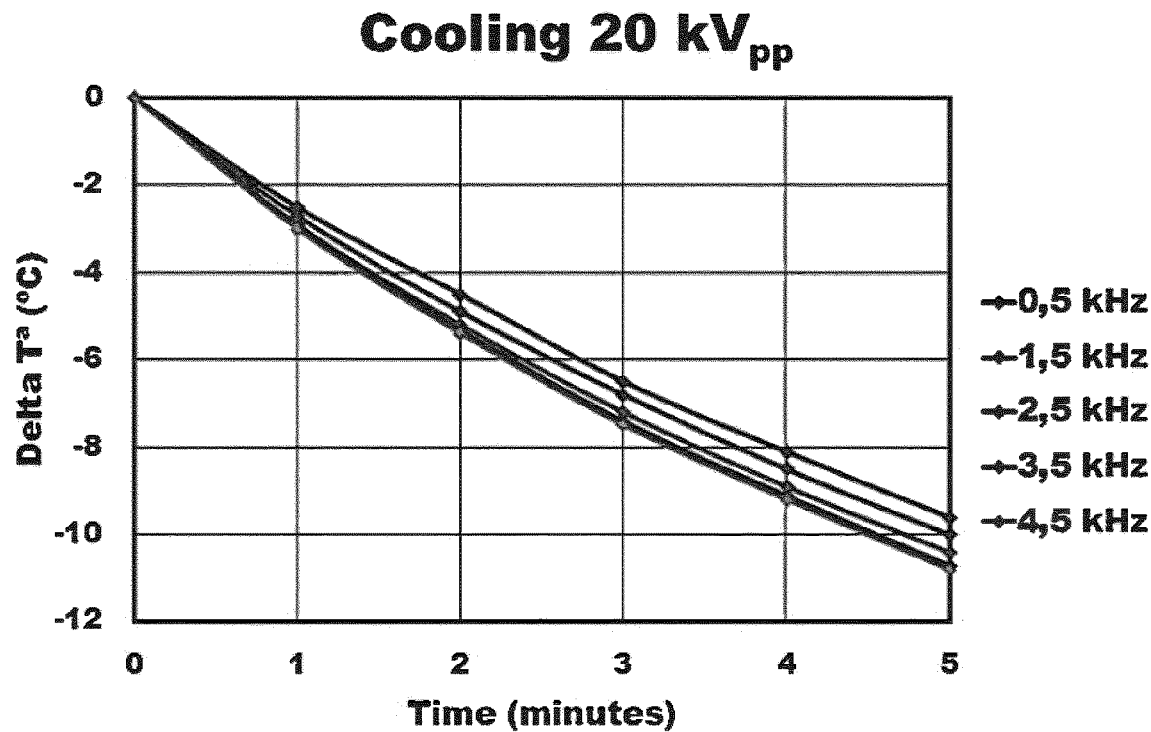
FIG. 13A shows the cooling effect as function of time and excitation frequency voltage.

FIG. 13A shows temperature variation over time for a flat plate heated at 70° C. under the action of an embodiment of the system of FIG. 4. The supply voltage is set fixed at $kV_{pp}$ of amplitude, while frequency is increased. As can be seen, an increase in the frequency implies a greater temperature decrease of the plate and consequently an increase in the cooling capacity. But this cooling capacity decreases when frequency is increased, even reversing the trend. Increasing the speed of ionic wind may cause increasing the temperature of the wind itself, so that after a certain time the plate may be re-heated. The control unit monitors this behavior to apply a counteracting configuration if required.

Figure 13B:
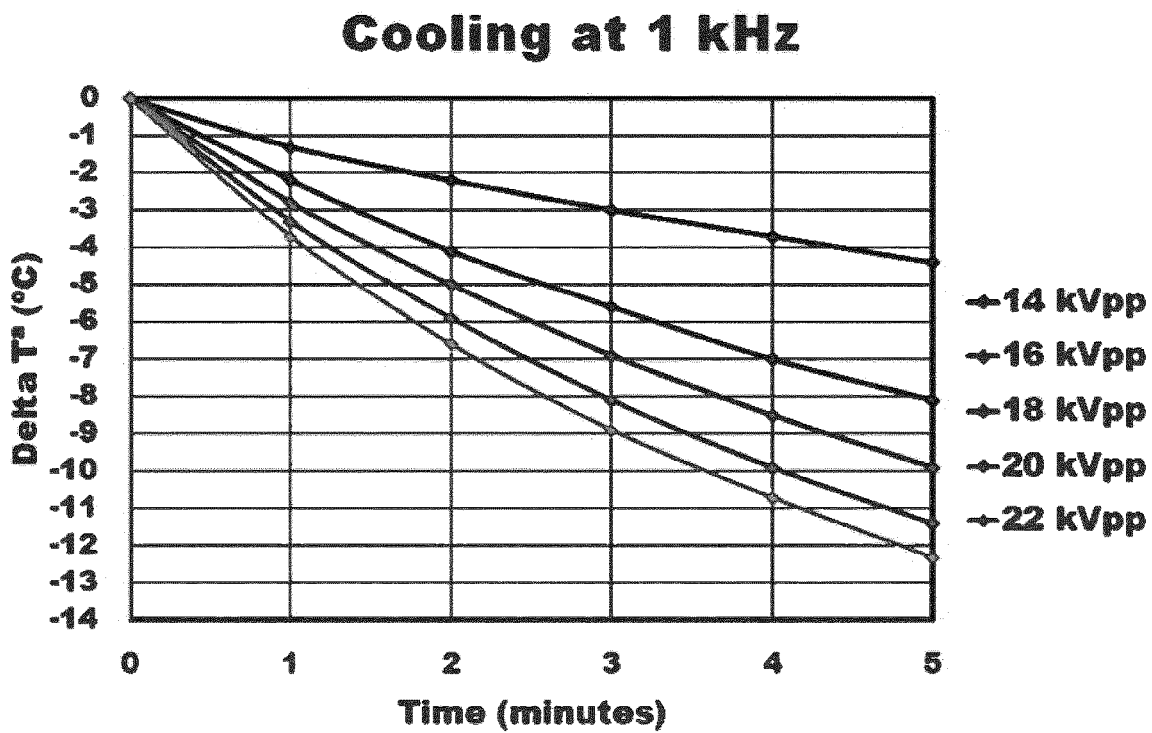
FIG. 13B shows the cooling effect as function of time and voltage amplitude.

FIG. 13B shows a similar behavior in a graph with several curves representing the temperature variation over time at a fixed frequency of 1 kHz, each curve corresponds with a value of amplitude voltage. It can be seen that each increase in voltage represents a minor improvement in cooling, canceling out and reversing it when voltage values are greater than 22 kVpp.

The curves of FIGS. 13A and 13B suggest cooling is possible applying DBD effect in exchange of a limited performance and a high-power consumption. This problem is addressed by performing a set of somewhat opposite actions.

EXAMPLES

Hereinafter, the present invention is described specifically with reference to some examples, which however are not intended to limit the present invention.

A dynamic control of settings of the power source is achieved with the control unit.

Setting Parameters for Cooling:

A frequency as low as possible to be set. DBD actuators operate in the 1 kHz to 50 kHz range on a regular basis. Advantageously, the present system allows the operating frequency to be lowered by at least one or two orders of magnitude, being the optimum range less than 100 Hz. For these lower frequencies, the ionic wind has little cooling capacity so the excitation voltage is increased by the control unit to values of the order of 25 $kV_{pp}$.

Several recommendations can be also provided for constructive parameters. First of all, imposing a separation between the exposed electrode and the encapsulated electrode, this implies a smaller plasma region and weaker ionic wind. However, a distance between electrodes also causes a non-homogeneous discharge. That is, the discharge does not have a repeatable behavior.

Secondly, to compensate for the non-homogeneity of the discharge, the exposed electrode, which is usually straight as shown in FIG. 5A, is replaced by a sawtooth electrode as illustrated in FIG. 5B, causing the discharges to always start on the electrode teeth. The discharge will be more homogeneous and the electric field more intense, compensating for the drawbacks of separating the two electrodes, increasing the parameter d.

With these design and operation actions, an ionic wind is achieved with a minimum increase in temperature. Hence, an excellent cooling can be achieved with minimal power consumption.

In summary, to achieve a good cooling capacity, a particular approach is followed departed from the normal operation of a DBD actuator. A different range of frequency is used, a separation between electrodes is required as well as particular shape to control the discharge.

Example of a Cooling Actuation

Let's consider as inputs a body temperature of 70 Celsius degrees, and a target temperature of 40 Celsius degrees. An ambient temperature about 25 Celsius degrees puts some conditions and/or restrictions. The higher the ambient temperature, the lower the heat flow dissipated from the surface of the body. On the other hand, a lower ambient temperature allows to reach a lower body temperature.

Constructive Parameters:
Thickness in the order of 0.5 mm (Kapton material).
Separation d between electrodes greater than 0 mm, preferably 3 mm.
Setting parameters:
i. Vpp<40 kVpp
ii. f>50 Hz
iii. Waveform: AC (sinusoidal, square . . . )
iv. Possibility of actuation with a duty cycle to reduce consumption.

In the case of a greater dielectric thickness, separation d can be reduced to 0 mm.
i. Vpp>12 kVpp
ii. f>500 Hz
iii. Waveform: AC (sinusoidal, square . . . )
iv. Possibility of acting with a work cycle to reduce consumption.

Setting Parameters for Heating:

A frequency and amplitude of the voltage as high as possible to be configured. The control unit shall work with a safety margin in order to avoid exceeding the temperature of the dielectric used and its dielectric breakdown. DBD actuators shall operate in the range of several kHz and tens of kV on a regular basis.

Example of a Heating Actuation

Let's consider as inputs a body temperature of −10 Celsius degrees, and a target temperature of 10 Celsius degrees. In case the ambient temperature is equal to or lower than the body temperature a higher energy input will be needed.

Constructive Parameters:

The room available in the application will condition the type and thickness of the dielectric material to be used. Using Kapton with a thickness of 0.5 mm allows us to overlap the electrodes, from negative d to 0 mm.

Setting Parameters:
   i. V>10 kV
   ii. f>2 kHz
   iii. Waveform: preferably nanopulses These and other features, functions, and advantages that have been discussed can be achieved independently in various embodiments or may be combined in yet other embodiments.

The invention claimed is:

1. A system for controlling temperature of a body comprising:
   a DBD actuator configured to be connectable to a power source and to produce an ionic wind on the body;
   a control unit configured to control the power source;
   wherein the control unit is configured to control the power source depending on a temperature difference between an input temperature and a target temperature ($T_{ta}$) on the body and further depending on an initial configuration,
   wherein the initial configuration comprises the following constructive parameters of the DBD actuator: number of electrodes, shape and geometry of electrodes, relative position between electrodes, dielectric material, dielectric thickness,
   wherein the initial configuration further comprises the following setting parameters of the power source: a frequency value, an amplitude value, a waveform signal and a duty cycle, wherein the control unit is further configured to adjust the initial configuration by modifying any of the setting parameters to control heat transferred to the produced ionic wind;
   wherein the system further comprises a temperature sensor configured to measure a temperature of a surface of the body, wherein the control unit is provided with the temperature of the surface of the body;
   wherein the control unit is configured to apply a cooling configuration if the target temperature is lower than the temperature of the surface of the body,
   wherein the cooling configuration comprises a frequency value lower than a maximum cooling frequency limit and an amplitude value higher than a minimum cooling amplitude limit, and
   wherein the heating configuration comprises a frequency value greater than a minimum heating frequency limit, an amplitude value lower than a maximum heating amplitude limit.

2. The system according to claim 1, wherein the DBD actuator comprises flexible components or adapts to a specific shape.

3. The system according to claim 1, wherein the dielectric material in the DBD actuator has a non-constant thickness.

4. The system according to claim 1 comprising multiple DBD actuators.

5. The system according to claim 3 wherein, if the target temperature is lower than the temperature of the surface of the body, the control unit is configured to apply a cooling configuration, wherein the cooling configuration comprises a frequency value lower than a maximum cooling frequency limit and an amplitude value higher than a minimum cooling amplitude limit.

6. The system according to claim 5, wherein the maximum cooling frequency limit is in the range of 10 Hz to 5 kHz and the minimum cooling amplitude limit is in the range of 5 k $V_{pp}$ to 40 k $V_{pp}$.

7. The system according to claim 5 wherein the maximum cooling frequency limit is in the range of 10 Hz to 100 Hz.

8. The system according to claim 5, where a separation between edges of the electrodes is between 0 and 8 mm.

9. The system according to claim 5, where the exposed electrode of the DBD actuator has a non-straight edge, preferably a sawtooth shape.

10. The system according to claim 1, wherein, if the target temperature is higher than the temperature of the surface of the body, the control unit is configured to apply a heating configuration, wherein the heating configuration comprises a frequency value greater than a minimum heating frequency limit, an amplitude value lower than a maximum heating amplitude limit.

11. The system according to claim 10, wherein the DBD actuator comprises a third electrode, wherein the third electrode and the first electrode are located on the same side of the dielectric medium, wherein the third electrode is electrically connected to the first electrode or to the second electrode or to an external power source (AC or DC) or remains as a floating electrode.

12. The system according to claim 10, where a separation between edges of the electrodes is negative, being both electrodes partially or completely overlapped.

13. A system for controlling temperature of a body comprising:
   a DBD actuator configured to be connectable to a power source and to produce an ionic wind on the body:
   a control unit configured to control the power source;
   wherein the control unit is configured to control the power source depending on a temperature difference between an input temperature and a target temperature ($T_{ta}$) on the body and further depending on an initial configuration,
   wherein the initial configuration comprises the following constructive parameters of the DBD actuator: number of electrodes, shape and geometry of electrodes, relative position between electrodes, dielectric material, dielectric thickness,
   wherein the initial configuration further comprises the following setting parameters of the power source: a frequency value, an amplitude value, a waveform signal and a duty cycle,
   wherein the control unit is further configured to adjust the initial configuration by modifying any of the setting parameters to control heat transferred to the produced ionic wind;
   wherein the system further comprises a temperature sensor configured to measure a temperature of a surface of the body, wherein the control unit is provided with the temperature of the surface of the body:

wherein the control unit is configured to apply a heating configuration if the target temperature is higher than the temperature of the surface of the body, wherein the cooling configuration comprises a frequency value lower than a maximum cooling frequency limit and an amplitude value higher than a minimum cooling amplitude limit, and wherein the heating configuration comprises a frequency value greater than a minimum heating frequency limit, an amplitude value lower than a maximum heating amplitude limit.

14. A system for controlling temperature of a body comprising:
- a DBD actuator configured to be connectable to a power source and to produce an ionic wind on the body:
- a control unit configured to control the power source;
- wherein the control unit is configured to control the power source depending on a temperature difference between an input temperature and a target temperature ($T_{ta}$) on the body and further depending on an initial configuration,
- wherein the initial configuration comprises the following constructive parameters of the DBD actuator: number of electrodes, shape and geometry of electrodes, relative position between electrodes, dielectric material, dielectric thickness,
- wherein the initial configuration further comprises the following setting parameters of the power source: a frequency value, an amplitude value, a waveform signal and a duty cycle,
- wherein the control unit is further configured to adjust the initial configuration by modifying any of the setting parameters to control heat transferred to the produced ionic wind;
- wherein the system further comprises a temperature sensor configured to measure a temperature of a surface of the body, wherein the control unit is provided with the temperature of the surface of the body;
- wherein the control unit is configured to apply a cooling configuration if the target temperature is lower than the temperature of the surface of the body and is configured to apply a heating configuration if the target temperature is higher than the temperature of the surface of the body,
- wherein the cooling configuration comprises a frequency value lower than a maximum cooling frequency limit and an amplitude value higher than a minimum cooling amplitude limit, and
- wherein the heating configuration comprises a frequency value greater than a minimum heating frequency limit, an amplitude value lower than a maximum heating amplitude limit.

* * * * *